US010587672B2

(12) United States Patent  (10) Patent No.: US 10,587,672 B2
Galloway et al.  (45) Date of Patent: Mar. 10, 2020

(54) SYSTEMS AND METHODS FOR CLIENT-SIDE CONTEXTUAL ENGAGEMENT

(71) Applicant: Moxie Software, Inc., Austin, TX (US)

(72) Inventors: Michael Galloway, San Jose, CA (US); Randy Nasson, San Francisco, CA (US); Jonathan Lee Bell, Austin, TX (US); Jonathan Pollock, Berkley, MA (US)

(73) Assignee: Moxie Software, Inc., Austin, TX (US)

( * ) Notice: Subject to any disclaimer, the term of this patent is extended or adjusted under 35 U.S.C. 154(b) by 488 days.

(21) Appl. No.: 14/819,043

(22) Filed: Aug. 5, 2015

(65) Prior Publication Data

US 2016/0044083 A1 Feb. 11, 2016

Related U.S. Application Data

(60) Provisional application No. 62/033,497, filed on Aug. 5, 2014.

(51) Int. Cl.
G06F 15/16 (2006.01)
H04L 29/08 (2006.01)

(52) U.S. Cl.
CPC ............ H04L 67/02 (2013.01); H04L 67/32 (2013.01)

(58) Field of Classification Search
CPC ................................ H04L 67/02; H04L 67/32
USPC ........................................................ 709/217
See application file for complete search history.

(56) References Cited

U.S. PATENT DOCUMENTS

| 6,751,659 B1* | 6/2004 | Fenger .................. H04L 29/06 |
| | | 709/221 |
| 8,676,895 B1 | 3/2014 | Roy et al. |
| 8,682,977 B1 | 3/2014 | Roy et al. |
| 8,825,734 B2 | 9/2014 | Roy et al. |
| 10,425,501 B2 | 9/2019 | Nasson |
| 2003/0069923 A1* | 4/2003 | Peart ..................... G06F 9/547 |
| | | 709/203 |
| 2004/0019595 A1 | 1/2004 | Bhogal et al. |

(Continued)

OTHER PUBLICATIONS

International Preliminary Report on Patentability issued for PCT Application No. PCT/US2015/043820, dated Feb. 16, 2017, 9 pages.

(Continued)

Primary Examiner — Brian Whipple
Assistant Examiner — Hannah S Wang
(74) Attorney, Agent, or Firm — Sprinkle IP Law Group

(57) ABSTRACT

Disclosed is a new approach for client-side contextual engagement with a website visitor. A browser loads a page containing a reference to a script file implementing a visitor client. The visitor client may store visitor client data including site rules and a visitor profile locally on the client device. The visitor client may include a context monitor for calling the decision engine, a decision engine for evaluating the site rules relative to a context defined at least partially by events occurring on the page and the visitor profile, and a widget manager for managing visitor client data persisted on the client device. The content monitor may call the decision engine when the context changes. The decision engine may determine, in real time and relative to the context, that proactive or reactive engagement(s) may be appropriate and call the widget manager to launch and display corresponding engagement channel(s) on the page.

20 Claims, 9 Drawing Sheets

(56) References Cited

U.S. PATENT DOCUMENTS

| | | |
|---|---|---|
| 2004/0030421 A1 | 2/2004 | Haley |
| 2005/0081144 A1 | 4/2005 | Hailey et al. |
| 2008/0046562 A1* | 2/2008 | Butler ............... G06F 17/3089 709/224 |
| 2008/0235194 A1 | 9/2008 | Shima et al. |
| 2009/0006415 A1 | 1/2009 | McAniff et al. |
| 2009/0171898 A1 | 7/2009 | Prager et al. |
| 2010/0107056 A1 | 4/2010 | Underhill et al. |
| 2010/0223378 A1 | 9/2010 | Wei |
| 2011/0010244 A1* | 1/2011 | Hatridge ............... G06Q 30/00 705/14.53 |
| 2011/0208822 A1 | 8/2011 | Rathod |
| 2011/0302098 A1 | 12/2011 | Yoshida et al. |
| 2011/0314092 A1* | 12/2011 | Lunt ............... G06F 17/30876 709/203 |
| 2012/0215624 A1 | 8/2012 | Ramer et al. |
| 2012/0221418 A1* | 8/2012 | Smith ............... G06Q 30/02 705/14.67 |
| 2012/0246558 A1 | 9/2012 | Brooks et al. |
| 2013/0054509 A1 | 2/2013 | Kass et al. |
| 2013/0091419 A1 | 4/2013 | Caliman et al. |
| 2013/0212497 A1* | 8/2013 | Zelenko ............ G06F 17/30867 715/760 |
| 2014/0012626 A1 | 1/2014 | Ajmera et al. |
| 2014/0082525 A1 | 3/2014 | Kass et al. |
| 2014/0089472 A1* | 3/2014 | Tessler ............... H04L 67/02 709/219 |
| 2014/0282121 A1 | 9/2014 | Sun et al. |
| 2015/0106686 A1 | 4/2015 | Blitzstein |
| 2015/0200822 A1* | 7/2015 | Zelenko ............. G06Q 30/0211 709/224 |
| 2016/0044083 A1 | 2/2016 | Galloway et al. |
| 2016/0070686 A1 | 3/2016 | Yu et al. |
| 2016/0162140 A1 | 6/2016 | Nasson et al. |
| 2016/0344838 A1* | 11/2016 | Wistow ............... H04L 67/2852 |

OTHER PUBLICATIONS

International Search Report and Written Opinion issued for PCT Patent Application No. PCT/US2015/043820, dated Oct. 28, 2015, 10 pages.

Office Action issued for U.S. Appl. No. 14/206,432, dated Mar. 10, 2016, 11 pages.

International Search Report and Written Opinion issued for PCT Patent Application No. PCT/US2015/064745, dated Feb. 12, 2016, 8 pages.

International Preliminary Report on Patentability issued for PCT Application No. PCT/US2015/064745, dated Jun. 22, 2017, 7 pages.

Office Action issued for U.S. Appl. No. 14/964,008, dated Oct. 17, 2017, 18 pages.

Office Action issued for U.S. Appl. No. 14/964,008, dated May 22, 2018, 22 pages.

Notice of Allowance for U.S. Appl. No. 14/964,008, dated May 15, 2019, 7 pgs.

* cited by examiner

SYSTEMS AND METHODS FOR CLIENT-SIDE CONTEXTUAL ENGAGEMENT

CROSS-REFERENCE TO RELATED APPLICATION(S)

This is a conversion of, and claims a benefit of priority from U.S. Provisional Application No. 62/033,497, filed Aug. 5, 2014, entitled "SYSTEMS AND METHODS FOR CLIENT-SIDE CONTEXTUAL ENGAGEMENT," which is fully incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

This disclosure relates generally to customer engagement. More particularly, embodiments disclosed herein relate to systems, methods, and computer program products for client-side contextual engagement with website visitors.

BACKGROUND OF THE INVENTION

Engaging website visitors in a timely manner with the correct customer engagement (e.g., presenting a discount offer on a product to a website visitor who has shown interest in the product; extending an invitation to a website visitor who has shown interest in a product to chat with a sales agent about the product, etc.) has been proven to result in an increase in sales and customer satisfaction.

Determining a correct type of customer engagement to present to a website visitor visiting a website usually requires a browser running on a client device to perform following steps:

1) On every page, make a request to an engagement server. Optionally, this can be done through a JavaScript/Flash request with additional data related to the page or the browser.
2) Poll the engagement server for next action. Optionally, a socket connection can be established and left open during an engagement.
3) The engagement server responds with a recommended engagement to display, and the details of the engagement.

An example of a server-based approach to customer engagement is illustrated in FIG. 1.

As shown in FIG. 1, system 100 may include a web browser application (or browser) 102, a website server 104, and an engagement server 106. For every web page requested (108), the server-based approach requires that browser 102 makes a request to engagement server 106 (110). Engagement server 106 is then periodically polled for a next action (112a-112c). Often, a socket connection between browser 102 and engagement server 106 is established (via a particular port) and left open during an engagement. In response to each poll, engagement server 106 evaluates engagement rules, determines whether to engage, and returns a response to browser 102 (114a-114c). If the response from engagement server 106 indicates a decision to engage, browser 102 then requests an engagement widget from engagement server 106 for display through browser 102 (112d).

Several problems exist with this server-based approach. For example, it is not possible for an engagement server or a decision engine at the server side to perform real-time decisioning on customer engagements. In a polling scenario such as one illustrated in FIG. 1, there will always be a time gap between polls, during which no engagement that is based on the current context of user interactions may be offered. This server-based approach therefore risks potentially missing a critical opportunity to react to context changes (due to user interactions such as mouse movements or changes in form inputs).

As another example, in the open socket connection scenario, the rate at which a decision can be processed on the server-side can be impacted by the load on the engagement server, the decision engine performance, and/or the transit time of the updated client information. These factors can all adversely impact or affect the ability of an engagement server to determine, in a timely manner, what engagement, if any, should be offered.

Furthermore, with a server-based approach, contextually-relevant information such as the location of a user's pointing device is limited to periodic updates and/or requires a stream of information travelling over network connection(s) which, again, can unfavorably impact performance. The competing interests here include the level of contextual relevance and the speed of the decisioning process on an engagement server. Typically, the need for performance (so as to avoid having to take a long time to load a page during which a website visitor may leave the page) outweighs the need for contextual relevance. Thus, an engagement server may be provided with less information that is contextually relevant to a page, a website visitor, or both. This unfortunately means that an engagement server can sometimes respond fast at the cost of accuracy and/or relevancy in determining a proper engagement, resulting in reduced or poor customer engagements.

Another issue with the server-based approach relates to network connectivity of mobile devices. Mobile devices with poor connections are extremely difficult to support using either the poll or the socket connection methods of the server-based approach described above.

Additionally, scalability can be a problematic issue, due at least in part to every page for every visitor of a website needing to either poll an engagement server or keep an open socket connection to the engagement server. Because the server requirements can be extremely high, scalability of the server-based approach is very limited, if not exceedingly cost-prohibitive.

As a result of these drawbacks, many websites take a simpler approach in which a page timer is used to trigger a decision to present an engagement. This time-based approach can also be problematic. For example, since contextual information from a page is not considered in the time-based approach, it has no impact on a website's decision to engage a website visitor who is viewing and/or interacting with the page. As such, there may not be any relationship between the website visitor's behavior on the page and the time-triggered decision to present them with an engagement. As a result, the website visitor may be bombarded with unnecessary and/or inappropriate engagement offers, leading to reduced or poor customer engagements.

SUMMARY OF THE DISCLOSURE

Embodiments disclosed herein provide a client-side approach for contextual engagement with website visitors. A system implementing client-side contextual engagement disclosed herein may include client-side visitor engagement control logic, referred to herein as a "Visitor Client," operating on a user device such as a smartphone, tablet, laptop computer, personal computer, etc., and client-side data storage for persisting on the user device certain components such as site rules, visitor profile data, and optionally engagement widgets, etc.

According to embodiments, instead of polling an engagement server for a decision, a Visitor Client can timely, intelligently, and appropriately decide, relative to a context of a website visitor's interaction with a website, whether to engage the website visitor, when to engage the website visitor, how to engage the website visitor, what engagement options to present to the website visitor, etc. To do so, the Visitor Client can perform real-time evaluations of engagement rules specific to the website (referred to herein as "site rules"), taking into account current actions taken by the website visitor and contextual information that the Visitor Client has collected.

In this disclosure, the particular context of a website visitor's interaction with a website is defined by contextual information including real-time events (e.g., user interface events generated by user interaction through an input/output device such as a mouse, keyboard, etc.), visitor profile data, page metadata (e.g., title, keyword, etc.), user device details, location data (e.g., using the Internet Protocol address of the user device to lookup the city, state, and/or country of the website visitor).

In some embodiments, a Visitor Client may be configured to monitor Document Object Model (DOM) events (e.g., via an event handler or listener in accordance with the DOM standardized by the World Wide Web Consortium (also known as the W3C)) for reactive/proactive engagements based on page interaction. Additionally, with client-side data storage, data can be persisted by the Visitor Client for subsequent utilization. This enables historical data to be maintained and accounted for in a client-side engagement decision making process. As such, the combination of a Visitor Client and client-side data storage can result in far fewer requests being made to server(s) at the server side and a far more responsive, contextually relevant, real-time engagement capability.

A method in accordance with embodiments may include, in response to a website visitor directing a browser running on a client device to a page of a website, the browser requesting the page from a web server. In response, the web server may return a source code file associated with the page to the browser. The source code file may contain a reference to a script file containing instructions implementing a Visitor Client. In loading the page, the browser retrieves and interprets the script file, thereby enabling the Visitor Client to run on the client device. If this is the first visit by the website visitor and/or if visitor client data persisted in a local storage has expired, the Visitor Client may load site rules for the website and visitor profile data for the website visitor, persist same in the local storage on the client device, start a client-side decision engine, monitor the behavior of the website visitor on the page and, when and where appropriate, launch engagement widget(s) and display same via engagement channel(s) on the page for reactive or proactive engagement with the website visitor. Alternatively or additionally, the Visitor Client may determine that the most appropriate action is not to engage the website visitor (i.e., an inaction), given the context of the website visitor's interaction with the page.

While the Visitor Client is domain-specific, the context monitoring performed by the Visitor Client can be page-specific. Furthermore, action taken by the Visitor Client can also be page-specific. Example actions performed by the Visitor Client may include launching one or more engagement widgets, each engagement widget representing a type of engagement or an engagement channel, and displaying same on the page. In this way, the action(s) taken by the Visitor Client and engagement channel(s) displayed on the web page would be context-relevant.

In some embodiments, types of website visitor engagements provided by a Visitor Client can include a chat type, an email type, a document type, a link type, an offer type, etc. In some embodiments, the type of engagement may be determined at least in part based on a user profile associated with a website visitor. In some embodiments, an engagement widget may be configured to generate a user interface for an engagement server. For example, a Visitor Client may proactively present a chat channel on a page when a website visitor is viewing a particular technical description of an item. Suppose the website visitor selects the chat channel, the engagement widget for the chat channel may generate and display a chat user interface (e.g., an iFrame) on the page and open a connection connecting the chat user interface to an engagement server. The engagement server, in turn, may notify an agent (who is associated with the website and who is familiar with the item and/or the particular technical description of the item) to engage with the website visitor. This type of "just-in-time" contextual engagement can be particular useful to website visitors seeking technical support, subject matter expertise, and/or additional information related on a product, etc.

In some embodiments, engagement widgets may be stored on a client device and/or retrieved from a server such as an application server. In some embodiments, as a website visitor navigates through a website, a Visitor Client operating on the client device may activate zero or more engagement widgets on each page of the website, depending upon the context of the website visitor's behavior relative to a particular page or a portion thereof. As the above example illustrates, embodiments disclosed herein can be advantageous in providing real-time, contextually relevant visitor engagement for sales, product support, website user experience, etc., significantly improving the relationship between websites and their visitors.

One embodiment comprises a system comprising at least one processor and at least one non-transitory computer-readable storage medium that stores computer instructions translatable by the at least one processor to perform a method substantially as described herein. Another embodiment comprises a computer program product having at least one non-transitory computer-readable storage medium that stores computer instructions translatable by at least one processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
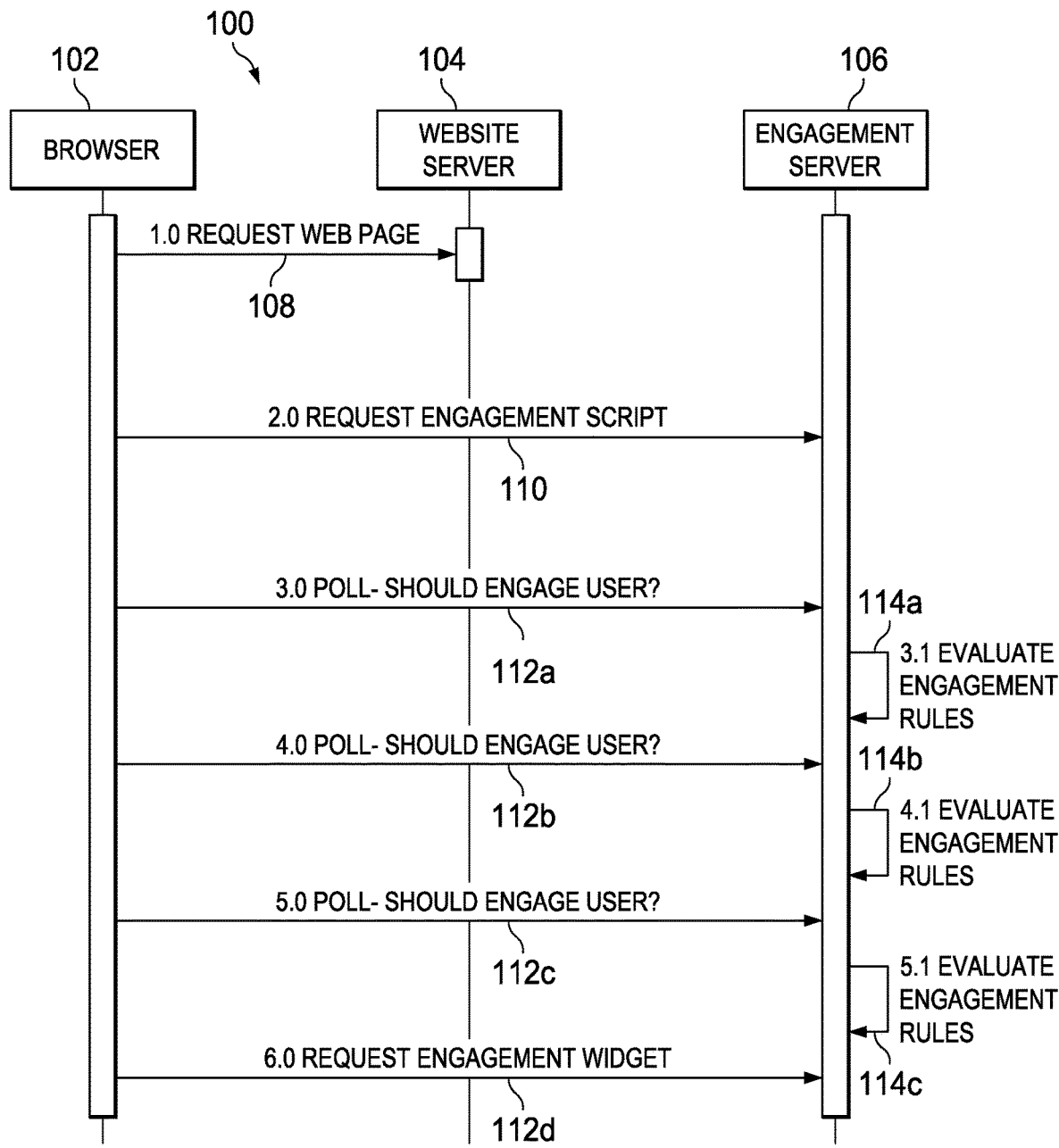
FIG. 1 depicts a sequence diagram illustrating a prior art example of a server-based approach to customer engagement.

As discussed above with reference to FIG. 1, in the field of customer engagement, although a browser and/or website can collect visitor data and send the visitor data to an engagement server or decision engine at the backend for further processing, such a server-based approach can be adversely impacted by many factors, including the load on the engagement server and/or the decision engine at the server side, the cost of keeping an open socket/port connection to the engagement server, the delay in between polls, the time needed to transmit/update information from the client side, etc. These factors contribute to the significant challenge in scalability and the difficulty in balancing between the level of contextual relevance and the speed of the decisioning process by an engagement server. As can be appreciated, it is not uncommon for a website visitor to leave or close a page altogether if the page is taking more than a few seconds to load. As such, websites may forgo contextual relevance in favor of speed, taking a time-based approach to engaging with their website visitors. However, as discussed above, because time-based engagement offers may lack contextual relevance, website visitors may not respond or, worse yet, may view the time-based engagement offers as an annoyance to their website visit experience.

Embodiments disclosed herein provide a client-based approach that can address the aforementioned drawbacks of prior approaches and provide just-in-time, relevant contextual customer engagement. In this disclosure, "customer engagement" refers to the engagement of customers or potential customers with a company or a brand through an online medium such as a website as well as a hybrid scenario in which a customer's online interaction with a website (at least initially) triggers an offline customer engagement. Skilled artisans appreciate that online customer engagement is qualitatively different from offline engagement as the nature of customer interactions with a brand, company and other customers differ on the Internet.

According to embodiments, to be effective in achieving the best possible result, a customer engagement should be:
offered at the right time (e.g., the moment a user experiences a problem or issue);
the right type of engagement for the user (e.g., a video chat for a premium-level customer); and
a relevant experience (e.g., displaying content such as knowledge articles based on known information about a user who is viewing a page and the page itself).

Figure 2:
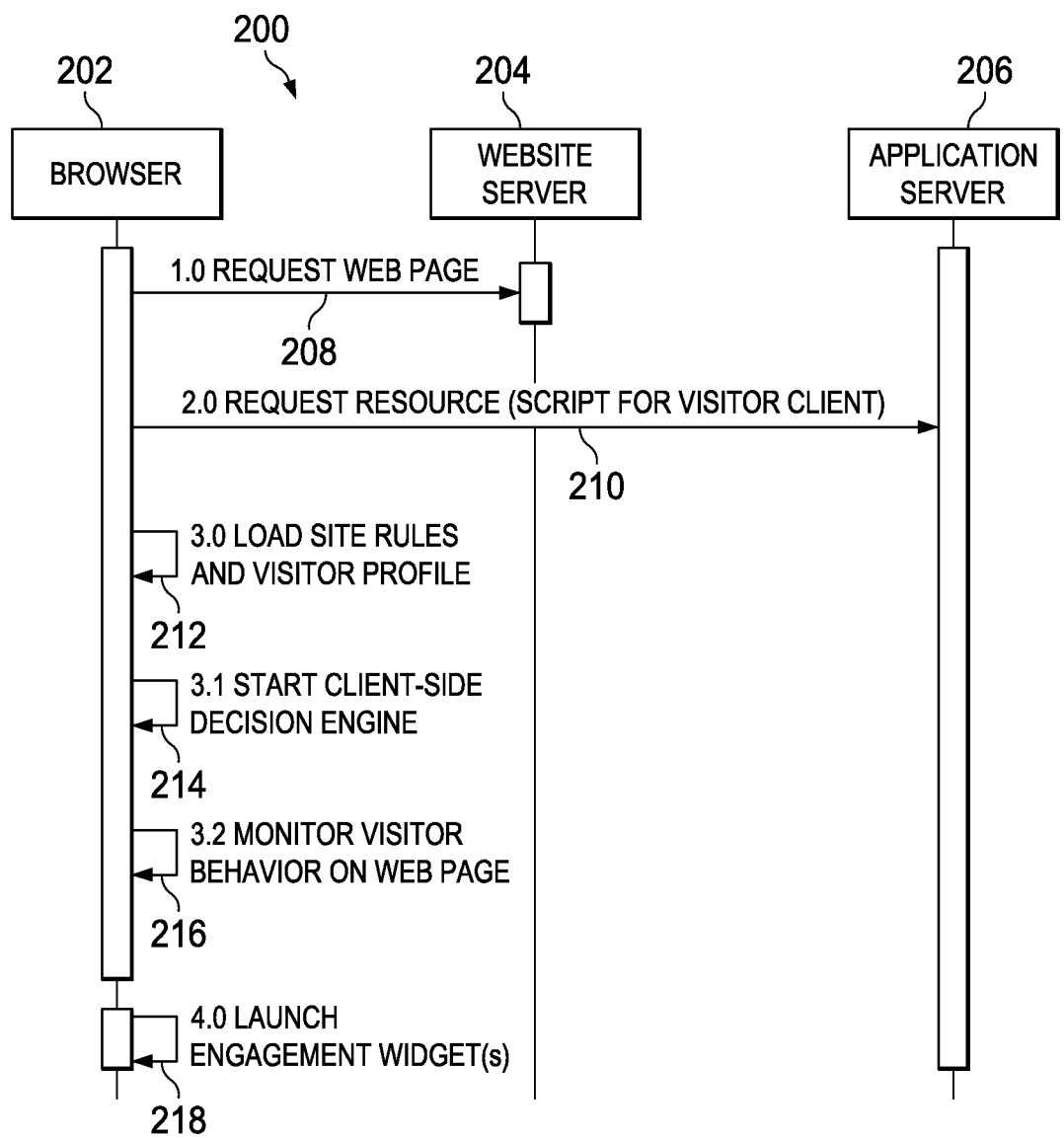
FIG. 2 depicts a sequence diagram illustrating an example of a method for client-side contextual engagement with a website visitor according to one embodiment disclosed herein.

As an example, FIG. 2 depicts a sequence diagram illustrating a method for client-side contextual engagement according to one embodiment disclosed herein. In the example of FIG. 2, system 200 may include a browser 202 running on a client device, a website server 204 hosting a website, and an application server 206 hosting client-side visitor engagement control logic. Application server 206 may reside in an entity computing environment or hosted in a cloud computing environment. Application server 206 may operate on one or more server machines.

As will be explained in greater detail below, responsive to a website visitor directing browser 202 to a website, browser 202 may request a web page from website server 204 (208). The web page (or, more specifically, a source code file associated with the web page) returned from website server 204 may include a reference (e.g., a script tag in JavaScript) to a script file hosted by application server 206 at a resource location (e.g., a network address) within application server 206 (or a host server such as one in a content delivery network, as described below). Browser 202 may load the web page received from website server 204. In doing so, the reference to application server 206 embedded in the web page received from website server 204 causes browser 202 to send a request for the referenced resource to application server 206. In response, application server 206 returns a script file containing instructions (e.g., JavaScript code) implementing the client-side visitor engagement control logic, referred to herein as a Visitor Client (210).

On the client device, the script file is read and interpreted by browser 202 (e.g., via a JavaScript interpreter of browser 202). This enables the Visitor Client to run on the client device while the web page is open on the client device. The Visitor Client may perform a number of actions. For example, if this is the initial call (and thus there is no visitor client data persisted locally on the client device) or if visitor client data in a local storage on the client device has expired, the Visitor Client may pull support components (e.g., from application server 206) such as site rules for the website (e.g., an engagement definition for this website as defined by the owner of the website), a visitor profile for the website visitor, and optionally interfaces for a plurality of engagement widgets, etc.

The Visitor Client may communicate these components to browser 202 and store (or update, if necessary) them in the local storage on the client device. Many suitable local storage means available on the client device may be used to implement this local storage. Example local storage means may include, but are not limited to, a browser cache associated with browser 202. As a non-limiting example, visitor client data persisted in the local storage on the client device may include site rules, visitor profile data, and engagement widgets.

In some embodiments, visitor profile data may include visitor details, historical details, device details, and session details. Visitor details may include tags, preferences, location, etc. Historical details may include the number of visits to a particular site, the number of purchases from the site, the knowledgebase articles viewed, and the number of times the visitor was invited to a chat. Device details may include information on the browser used, the user device used (e.g., a smart phone, tablet, desktop computer, laptop computer, etc.), and the screen size. Session details may include information on a referral site, the visitor journey (within the session), the value in a cart associated with the page, the number of engagements in the session, and whether the checkout in the session was completed.

The visitor journey is a track file persisted locally as part of the visitor profile data and gets sent back to the server for record keeping. The visitor journey may be cleared out when the session ends (e.g., a transaction is complete), but the visitor profile remains. The visitor journey tracks a website visitor's journey from opening (loading) a page to some predefined end. Within each journey, zero to multiple engagements may occur.

In some embodiments, visitor profile data may be stored in a JavaScript Object Notation (JSON) object data structure. An example visitor profile object may have the following properties and associated data types. In some embodiments, object data types such as those listed below may implement similar JSON object data structures.

| Property | Data Type | Description |
|---|---|---|
| tag | Array of Strings | List of tags associated with the user. Useful for classifying the user. |
| ip_address | String | The current IP Address for the user |
| device | Device Object | Details on the device that the user is using |
| browser | Browser Object | Details on the browser that the user is using |
| location | Location Object | Current location information for the user |
| preferences | Preferences Object | User preferences |
| session | Session Object | Used for tracking information on the current session |
| history | History Object | Historical metrics |
| last_updated | Numeric | Timestamp of the last time the profile was updated |
| last_submitted | Numeric | Timestamp of the last time the profile was submitted to the server |

As directed by the Visitor Client, browser 202 may load site rules (i.e., contextual engagement rules for the particular website) and visitor profile data from the local storage (212), start a client-side decision engine (214), and monitor the behavior of the website visitor on the web page (216). As the website visitor interacts with the web page (e.g., adding an item to a cart), the Visitor Client can monitor/listen to events occurring relative to the web page (e.g., DOM events including mouse movement, clicks, etc. defined by the W3C for web browsers to notify the system in a known manner), execute the site rules without calling a remote server (e.g., application server 206) at the server side, and determine/control the appearance of an engagement layer (e.g., color, text, style, layout, etc.) overlaying the web page.

Depending upon the website visitor's behavior relative to the web page, one or more engagement widgets may be launched and corresponding engagement channels (e.g., chat, email, knowledge article, etc.) displayed via browser 202 over or on the web page that the website visitor is viewing (218). Each engagement channel is associated with and supported by an engagement widget. In some embodiments, one or more engagement widgets may be associated with one or more engagement servers configured to respond to requests for engagement received via the one or more engagement widgets.

Figure 3:
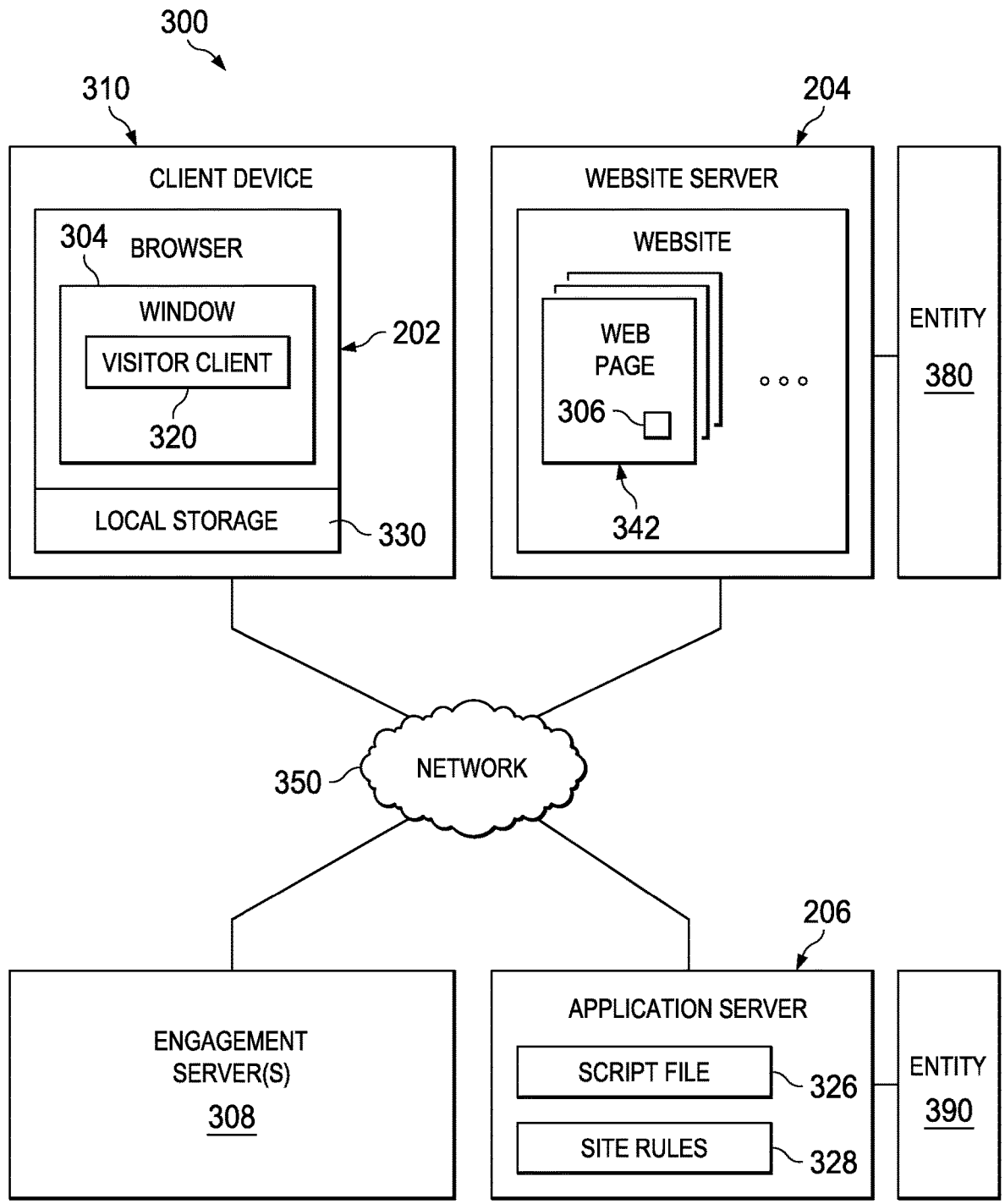
FIG. 3 depicts a diagrammatic representation of a network environment in which embodiments disclosed herein may be implemented.

The above-described method for client-side contextual engagement with a website visitor can be implemented in any suitable network environment, an example of which is illustrated in FIG. 3.

In the example of FIG. 3, system 300 may include a client device 310, website server 204, application server 206, and engagement server(s) 308 communicatively connected to a network 350. Website server 204 may be owned and operated by entity 380, while application server 206 may be owned and operated by entity 390. Entity 390 may be independent of entity 380. One or more engagement servers may be owned by entity 380. One or more engagement servers may be owned by entity 390. One or more engagement servers may be owned by a third party not owned by either entity 380 or entity 390.

Browser 202 described above may run on client device 310. As described above, responsive to a user directing browser 202 to a website 340 hosted on website server 204, browser 202 may open a window 304 and send a request for web page 342 of website 340 to website server 204. Website 340 may comprise one or more web pages that implement client-side contextual engagement supported by application server 206. As a non-limiting example, web page 342 may contain a reference 306 such as a script tag that references a scrip file 326 hosted on application server 206 (e.g., at a resource location or network address where script file 326 is stored on application server 206).

In loading web page 342 (which includes reading and parsing a corresponding source code file in a markup language such as HyperText Markup Language or HTML), browser 202 is directed by reference 306 embedded in the source code file of web page 342 to retrieve script file 326 from application server 206 and interpret (e.g., via a JavaScript interpreter of browser 202) script file 326 which, in turn, enables client-side contextual visitor engagement control logic, referred to as Visitor Client 320, to run within window 304 displaying web page 342 on client device 310. That is, in some embodiments, Visitor Client 320 may be implemented as an application loaded into a browser window running on a client machine. Some implementations may take advantage of client-side browser technologies including JavaScript and HTML5 localStorage known to those skilled in the art. Other implementations may leverage Adobe Flash or other client-side technologies that have the same, or greater, capabilities.

With reference 306 embedded in the source code file of web page 342, Visitor Client 320 can be activated on page load and operate within window 304. According to embodiments, the Visitor Client is responsible for pulling in a set of site rules (e.g., from site rules 328 hosted on application server 206) for website 340, visitor profile for a current website visitor, and optionally engagement widgets. It also evaluates the set of site rules on the client side, adds/removes engagement widgets to/from the page, monitors the page for context changes, manages the local storage, and uploads log data to the application server.

Accordingly, Visitor Client 320 may first check local storage 330 to see if visitor client data such as site rules that are applicable to website 340 are persisted in local storage 330. If not, Visitor Client 320 may pull them from application server 206. Otherwise, Visitor Client 320 may provide and control client-side contextual engagement relative to web page 342 displayed in window 304 on client device 310 with insignificant support, if any, from application server 206. As will be discussed in greater detail below, once the necessary client-side contextual engagement components and visitor client data have been loaded (either by pulling from a server, a content delivery network, a cloud, or a local storage on a client device) in a browser window, the decisioning and contextual engagements can be managed by the Visitor Client completely at the client side.

In some embodiments, Visitor Client 320 may include a plurality of contextual engagement components including a decision engine, a context monitor, and a widget manager. In some embodiments, the plurality of contextual engagement components can be JavaScript components that can be persisted on a client machine.

Figure 4:
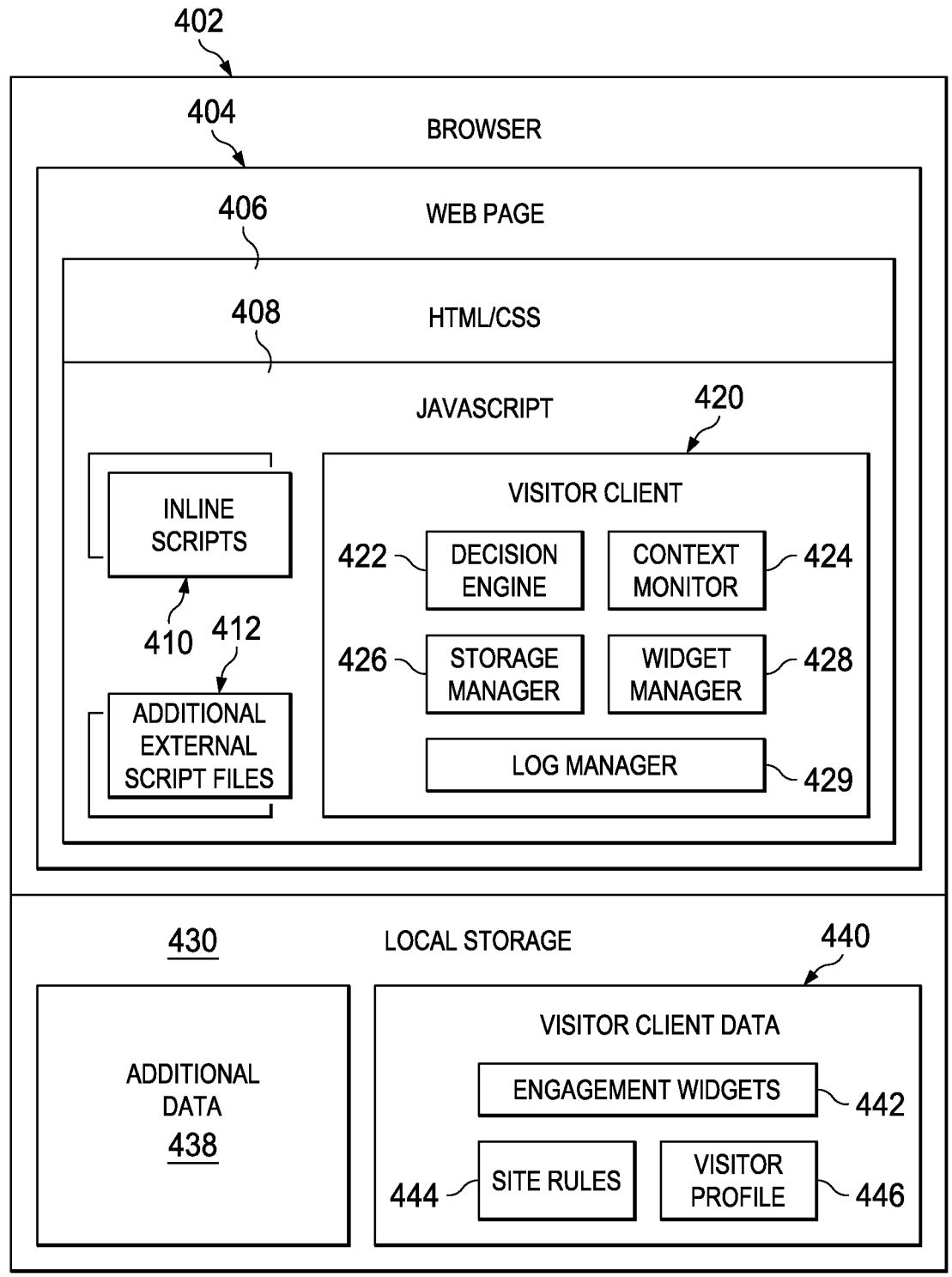
FIG. 4 depicts a diagrammatic representation of an example of client-side contextual engagement architecture.

A diagrammatic representation of an example of client-side contextual engagement architecture is shown in FIG. 4. In this example, the client-side contextual engagement architecture may include a web browser 402 having a web page 404. Web page 404 may be provided by a web server (e.g., website server 204) as described above and rendered by web browser 402 using HTML/Cascading Style Sheets (CSS) 406 and JavaScript 408 in a known manner. For example, JavaScript 408 may include inline scripts 410 and additional external script files 412.

In addition, JavaScript 408 may include Visitor Client 420 downloaded from an application server (e.g., application server 206) as described above. In some embodiments, Visitor Client 420 may include contextual engagement components such as a decision engine 422, a context monitor 424, a storage manager 426, a widget manager 428, and a log manager 429.

In some embodiments, decision engine 422 is configured for handling the evaluation of site rules 444, calling widget manager 428 to launch an engagement, calling log manager 429 when a log event occurs, and calling context monitor 424 to add, remove, register, or unregister a site rule, as explained further below. Decision engine 422 can be called by context monitor 424 when a context changes. Decision engine 422 can be configured such that it is triggered at page load. Decision engine 422 may determine, on page load, which rules to evaluate. Decision engine 422 may evaluate the applicable rules relative to a particular context. An example of a decisioning process performed by decision engine 422 is provided below with reference to FIG. 9. In this disclosure, a context is defined by DOM events, visitor profile data, web page metadata, device details, and location information that can be derived from a browser request.

In some embodiments, context monitor 424 is configured for monitoring DOM events pertaining to web page 404 and for calling decision engine 422. In some embodiments, context monitor 424 may manage visitor profile 446 and automatically track various pieces of information including, at the page level, page viewed, time spent on the current page, pointing device (e.g., mouse) inactivity time on the current page (which may indicate a user interest in a product or article displayed on the page), page unload, last click time, last click element, etc. At the visitor level, context monitor 424 may track browser and device details such as screen size and device type (e.g., mobile, desktop, tablet, etc.). At the session level, context monitor 424 may track visitor journey, cart value, checkout status, engagement offered/accepted, etc. As discussed above, context monitor 424 can be called by decision engine 422 and can call decision engine 422 when the context changes and on page load. In some embodiments, context monitor 424 may call storage manager 426 to update the visitor profile 446.

In some embodiments, storage manager 426 is responsible for fetching site rules 444, visitor profile 446, and engagement widgets 442. Storage manager 426 may monitor expiration times of stored visitor client components and refresh (fetch) expired visitor client components (engagement widgets 442, site rules 444, visitor profile 446) stored in local storage 430. Storage manager 426 may be called by log manager 429 to store logs and context monitor 424 to update the visitor profile 446. As a non-limiting example, on page load, storage manager 426 may set a browser cookie such as a universally unique identifier (UUID), fetch visitor client data 440 from an application server or a content delivery network (CDN), and store in local storage 430 the browser cookie and the expiration time set for the fetched visitor client data 440. Storage manager 426 may refresh visitor client data 440 on the next page load if visitor client data 440 has expired. If needed, the UUID can be used to reload web page 404 and hence visitor client 420.

In some embodiments, widget manager 428 is configured for managing any engagement widget added to web page 404 and displaying same as engagement channel(s)/icon(s) on web page 404. Specifically, widget manager 428 may handle the startup, insert, and shutdown of engagement widgets 442. Widget manager 428 may provide an application programming interface (API) for engagement widgets 442 to interface with other components of Visitor Client 420 (e.g., per a site rule action, explained below, reactively or proactively add an engagement widget to a Visitor Client user interface, change a view of the Visitor Client user interface, display or hide the Visitor Client user interface, etc.). Widget manager 428 may manage an engagement widget interface (e.g., an iFrame) and provide a bridge for the engagement widget interface to connect to an engagement server at the backend. Widget manager 428 may call context monitor 424 for context updates and may be called by decision engine 422 when an engagement widget should be added or removed and/or by context monitor 424 when an engagement widget should be notified of a context change.

In some embodiments, log manager 429 is configured for sending log data back to the application server. In some embodiments, the log data may comprise visitor profile data. In some embodiments, personal identifiable information (PII) is not included in the log data that got sent to the application server. In some embodiments, only a delta of visitor profile data is sent. Log manager 429 may call storage manager 426 to store the log data that it had collected and may be called by context monitor 424 on every page load. In some embodiments, log manager 429 may be trigged by an action. For example, log manager 429 may be called by decision engine 422 if a rule dictates that the log data should be sent to the application server and deleted from local storage 430.

In the example shown in FIG. 4, a local storage 430 (e.g., a non-transitory computer readable medium or a portion thereof) may be utilized by browser 402 for persisting temporary internet files and/or additional data 438 on a client device. As a non-limiting example, storage manager 426 of Visitor Client 420 may also utilize local storage 430 for persisting visitor client data 440 which, in this example, include engagement widgets 442, site rules 444, and visitor profile 446. As a non-limiting example, an engagement widget may be implemented as a JavaScript wrapped HTML widget that contains the primary engagement user interface to an engagement server providing a particular engagement service. As a non-limiting example, a site rule may be implemented in the JSON format supported by decision engine 422. As a non-limiting example, a user profile can be implemented as an object such as a JSON object. A user profile may be updated with context related data by context monitor 424 (e.g., what page is the user on). A user profile may be managed by storage manager 426. A visitor profile may include a JSON object of visitor data, tracked data points, static data, and journey information. An example of a visitor profile JSON object data structure is provided above. Additional details on engagement widgets 442 and site rules 444 are provided below.

As discussed above, local storage 430 may be implemented using any suitable local storage means on a client device and is not limited to using a browser cache, HTML5 localStorage, or the like. Skilled artisans appreciate that a browser cache is a repository for stored data that is used to expedite the process of retrieving data. In some embodiments, Visitor Client 420 may utilize a browser cache to persist visitor client data 440 for monitoring, controlling, and providing client-side contextual engagements entirely on the client side and without having to contact a remote server and/or retrieve data from the server side. Skilled artisans also appreciate that HTML5 localStorage is a client-side key-value database for storing web application data that is not transferred to a server. In some embodiments, Visitor Client 420 may utilize HTML5 localStorage to persist visitor client data 440 and may communicate the persisted visitor client data 440, such as visitor profile 446, or a portion thereof to a server. Persisted visitor client data 440 will not be deleted when web page 404 and/or browser 402 is closed, and will be stored and available indefinitely until local storage 430 is cleared, reformatted, or destroyed. For example, the user can clear local storage 430, or set browser 402 to clear local storage 430 when the user leaves web page 404.

When local storage 430 is emptied or cleared, all the data, including Visitor Client 420 and visitor client data 440, are flushed away (i.e., deleted from local storage 430). As another example, the user may run browser 402 in the private mode, in which case, no data is kept when browser 402 is closed. Different browsers handle the private mode different ways, so other implementations may also be possible. Accordingly, Visitor Client 420 may or may not be present on the client device the next time the user visits the website. If Visitor Client 420 is not already on the client device, on the next request for web page 404 by browser 402, Visitor Client 420 is again retrieved and loaded within web page 404 as described above.

As a user interacts with web page 404 (e.g., the user puts an item in a shopping cart, the user starts to fill a text input such as an order form, the user provides their credit card information, etc.), their interaction is monitored by context monitor 424 and logged by log manager 429. Decision engine 422 can evaluate site rules 444 in context of user interaction with web page 404 and visitor profile 446. Site rules 444 may be defined by the owner of the website and provided to the application server (e.g., application server 206). Site rules 444 describe what contextual criteria must be satisfied before Visitor Client 420 may engage a website visitor. When initiated, Visitor Client 420 may be configured to check with the application server and dynamically update site rules 444 if necessary. Accordingly, different types of user actions may trigger different real time reaction and/or proactive action(s) by Visitor Client 420 (e.g., different one(s) of engagement widgets 442, which are managed by widget manager 428, may be provided to the user as engagement channel(s) on web page 404).

In this way, the client-side contextual engagement architecture can advantageously eliminate the need to make customer engagement decisions on the server side in order to take real-time actions that are triggered by events such as mouse over or clickstream. The client-side contextual engagement architecture can advance the art by reducing the number of server calls that otherwise would be necessary for websites to make in order to provide contextual engagement options, such as proactive sales chat, proactive knowledge articles, reactive contextual engagement, etc., to website visitors.

Since the Visitor Client is automatically loaded on a web page and runs within a browser window, it does not require an installation of a browser extension or plug-in. The Visitor Client is not an independent, discrete application installed on a client device and does not require an end user to enhance or install or even aware that the Visitor Client is automatically pulled in by the browser. The Visitor Client does not directly communicate with the operating system of the client device or the client device itself.

According to embodiments, a Visitor Client exists only within a browser window and is domain-specific (i.e., the Visitor Client for website A will not function on website B which may or may not have its own Visitor Client). As a user navigates through a website that implements client-side contextual engagement disclosed herein, a Visitor Client for the website may apply rules in a page-specific manner. If the user opens multiple browser windows directed to different websites that implement client-side contextual engagement disclosed herein, different Visitor Clients may be loaded and run within the browser environment on the client device, each Visitor Client specific to a website. These Visitor Clients may be completely independent of one another as their corresponding domains are controlled by different entities.

Figure 6:
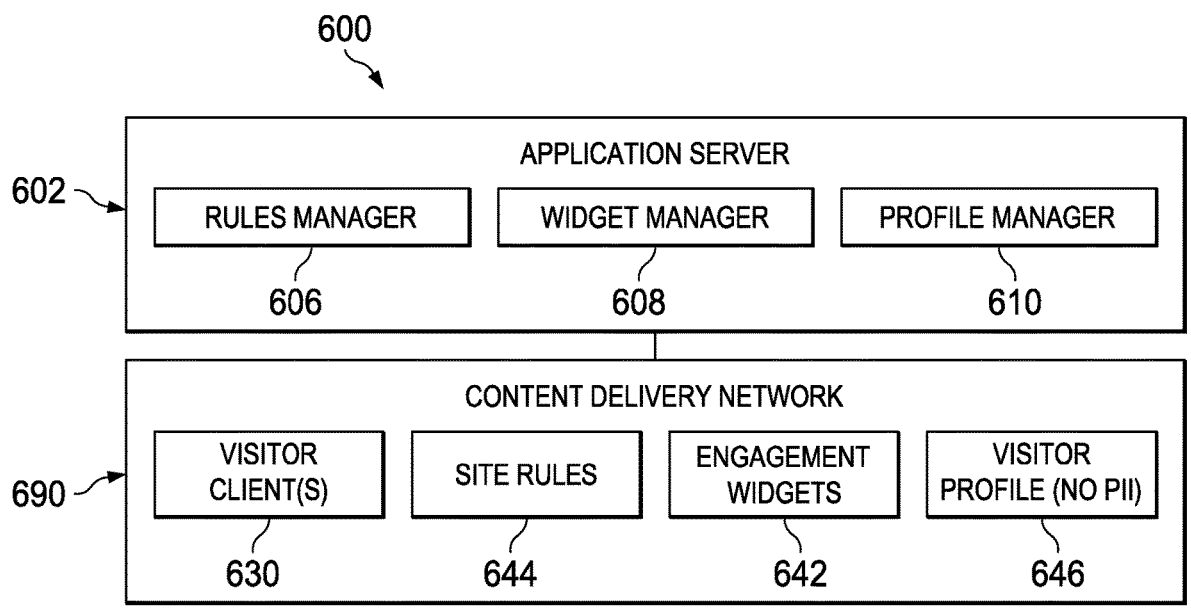
FIG. 6 depicts a diagrammatic representation of an example of a server architecture according to one embodiment disclosed herein.

Referring to FIG. 4, each such Visitor Client 420 would have a corresponding set of contextual engagement components and corresponding visitor client data 440 persisted in local storage 430. Likewise, locally persisted visitor client data 440 may include site rules 444, visitor profile 446, and optionally engagement widget 442 for each website. In some embodiments, when server-side content is required to provide a particular engagement relative to a particular web page, a corresponding Visitor Client 420 may locate one or more engagement widgets locally and/or on a server (e.g., via a widget manager 608 of an application server 602 and/or engagement widgets 642 stored in a content delivery network (CDN) 690, as illustrated in FIG. 6).

As an example, decision engine 422 may operate in conjunction with context monitor 424. Specifically, in response to a particular context provided by context monitor 424, decision engine 422 may access site rules 444 and visitor profile 446 and determine whether an engagement is desired and, if so, of what type. Decision engine 422 will cause widget manager 428 to access one or more appropriate engagement widgets (locally from engagement widgets 442 and/or externally from CDN 690/application server 602) and generate corresponding engagement channel(s) on web page 404 (e.g., engagement channels 510 shown in FIG. 5).

Figure 5:
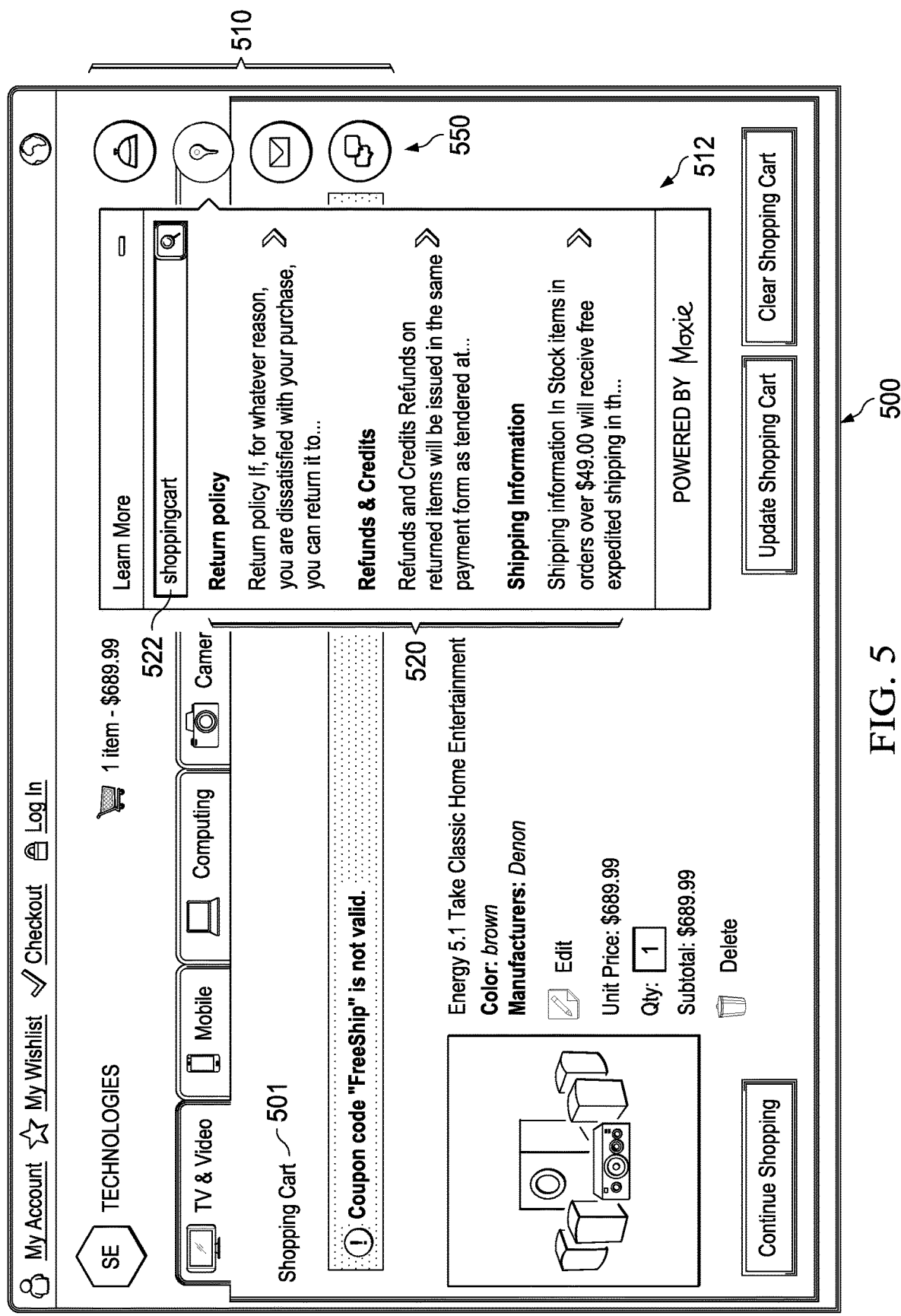
FIG. 5 depicts a diagrammatic representation of a user interface illustrating an example of a client-side contextual engagement in real time according to one embodiment disclosed herein.

FIG. 5 depicts a diagrammatic representation of a user interface illustrating an example of a client-side contextual engagement in real time according to one embodiment disclosed herein. As discussed above, a user action (or combination(s) of actions) that matters to the website can be identified beforehand, and proper responses when all the conditions (e.g., as defined in site rules 444) are satisfied can be determined in advance (e.g., by the owner of the website) and evaluated in real time by the Visitor Client (Visitor Client 420) at the client side. In this example, a user has placed an item in a shopping cart 501 via web page 500 and entered a coupon code that is not valid. The item in shopping cart 501 has a unit price of over $500. In this context, the Visitor Client may take action in real time by determining and immediately displaying appropriate engagement channels 510 (e.g., on engagement layer or Visitor Client user interface 550 overlaying web page 500) without having to contact a server at the backend.

In the example of FIG. 5, engagement channels 510 include a call channel, a knowledge channel, an email channel, and a chat channel. Although FIG. 5 shows four engagement channels, skilled artisans appreciate that embodiments of the Visitor Client may determine and provide zero or more engagement channels to a website visitor, given the context of the website visitor's interaction with a web page. Furthermore, although not shown in FIG. 5, other types of engagements such as video chat, may also be determined and provided by the Visitor Client disclosed herein. Clicking on or otherwise selecting an engagement channel (represented by a corresponding icon as shown in FIG. 5) may result in a display of an appropriate engagement window that allows for accessing an engagement server, as will be discussed in greater detail below.

As illustrated in FIG. 5, when an engagement channel (e.g., the knowledge channel) is selected, a widget manager (e.g., widget manager 428 described above) may operate to open a popup engagement window or interface 512 to an engagement server. In this example, interface 512 of the knowledge channel provides a connection to a knowledge base server (which is a type of an engagement server). Interface 512 may display articles 520 from the knowledge base that are relevant to the context and may include an input field 522 where the user may enter keywords or a query to search the knowledge base for more information. A log manager (e.g., log manager 429 described above) may record details of these interactions and store same in a visitor profile (e.g., visitor profile 446 described above).

A diagrammatic representation of an example of server architecture according to one embodiment disclosed herein is shown in FIG. 6. In the embodiment illustrated, server architecture 600 includes an application server 602 and a content delivery network 690. Application server 602 may include one or more engagement manger applications, such as a rules manager 606, a widget manager 608, and a profile manager 610. Rules manager 606 may be configured for managing site rules for websites that implement client-side contextual engagement (e.g., site rules 444 for web page 404). For example, in response to a request from the website, rules manager 606 may update site rules 444 for web page 404. In some embodiments, site rules managed by rules manager 606 may be pushed to CDN 690 and stored as site rules 644 on CDN 690. CDN 690 may provide site rules 644 as requested (e.g., by Visitor Client 420). In some embodiments, engagement widgets 642 and visitor profile 646 may be offloaded to CDN 690 in a similar manner. However, no PII is ever stored on CDN 690. In some embodiments, various visitor clients 630, each for a different web site, may also be offloaded to CDN 690. Other delivery mechanisms may also be implemented to provide the Visitor Client (e.g., Visitor Client 420) to a browser (e.g., browser 402) running on a client device.

Figure 7:
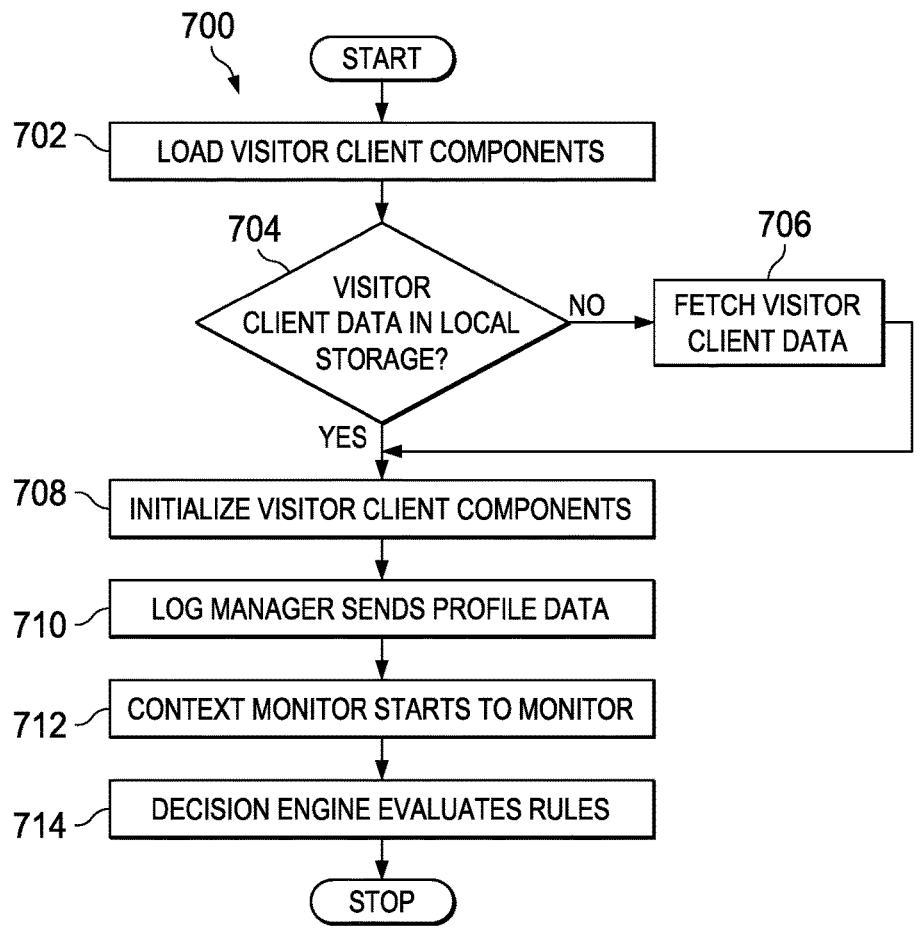
FIG. 7 depicts a flow diagram illustrating an example of a method for client-side contextual engagement according to one embodiment disclosed herein.

FIG. 7 depicts a flow diagram illustrating an example of a method for client-side contextual engagement according to one embodiment disclosed herein. As described above, a website visitor may direct a browser to a website that subscribes to otherwise implements client-side contextual engagement services provided by an application server (e.g., application server 206). Method 700 may occur initially on loading a web page of such a website. The source code of the page may include an embedded reference (e.g., reference 306) to a script file (e.g., script file 326) that implements a Visitor Client (e.g., Visitor Client 320). As directed by the Visitor Client, the browser may load contextual engagement components (also referred to as visitor client components) (702). As discussed above, visitor client components can include a decision engine, a context monitor, a storage manager, a widget manager, and a log manager.

At 704, the storage manager may check a local storage and determine if there is a need to fetch visitor client data (e.g., visitor client data does not exist or has expired). The visitor client data may be fetched as needed (706). In some embodiments, some site rules may allow for third-party data to be used through a server connector network to the application server, in which case, the third-party data may be fetched as well. Next, the loaded visitor client components are initialized (708). Once initialized, the log manager may send profile data to the application server (710), the context monitor may start to monitor the client's usage of the web site (712), and the decision engine may evaluate the rules to determine if, when, and of what kind of engagement should be presented on the page that the website visitor is viewing.

As discussed above, the decision engine is configured for evaluating site rules and executing actions. Site rules may be defined per site and stored in a file accessible by the decision engine. In some embodiments, site rules may be registered.

A rule that is registered for a site means that the rule needs to be evaluated for the site. Registration allows scoping and scheduling—what rules should be evaluated and when. This is an efficient mechanism for rules evaluation as to what (selection), when (time), and where (location). Specifically, a section in the rule definition file called "scope" allows the decision engine to perform a quick scan on two or more values (e.g., time and location (page address)) across all domain-specific site rules and determine which site rules apply to the current page and/or time (which may change from page to page). As a non-limiting example, a site rule may specify that a chat channel is only available between the hours of 9 AM and 5 PM. If a user visits the website at 8:50 AM, the decision engine may determine not to activate the chat channel because no chat agent is available at that time. As another example, a website may have a set of pages and 1000 rules. Not all 1000 rules may apply to each of the set of pages. This is referred to as "scoping." Even for rules that do apply to a page, their application may depend upon the time of day. This is referred to as "scheduling." Such scoping and scheduling in rules evaluation allow the decision engine to quickly and efficiently eliminate site rules that do not apply (not the right page or not the right time, regardless of what that rule defines) and apply only those site rules that matter.

Figure 8:
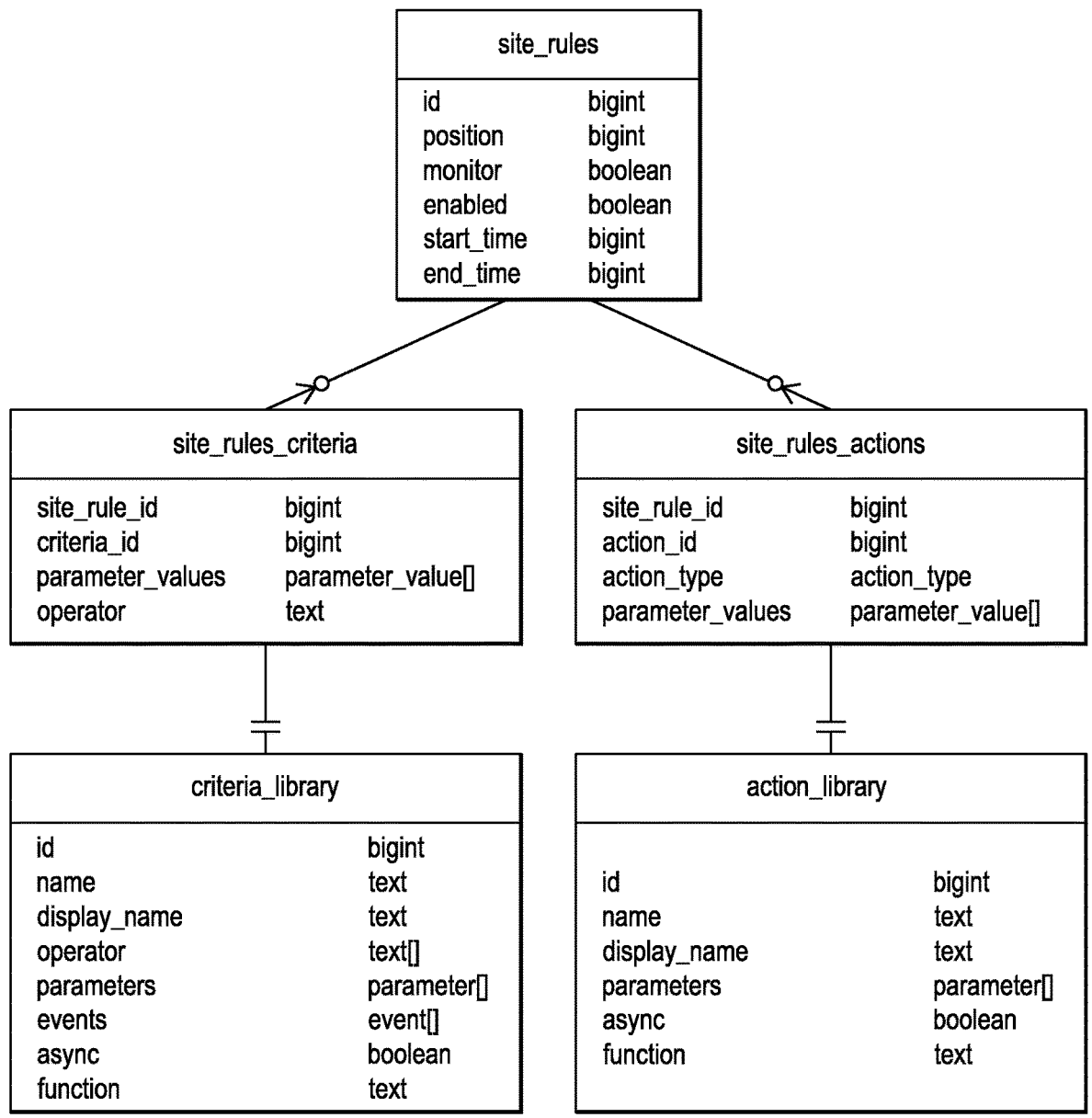
FIG. 8 depicts a diagrammatic representation of an example of an entity relationship diagram illustrating a site rules data structure according to one embodiment disclosed herein.

Site rules can be built to determine when and how visitors to a website are to be engaged (e.g., via various engagement channels such as call, chat, knowledge/article, email, etc.). Site rules may be defined based on criteria and actions. Criteria are conditions that must be satisfied before an action or actions can take place. In embodiments disclosed herein, site rules implement an innovative structure and serve a specific purpose of client-side contextual engagement. As a non-limiting example, an entity relationship diagram for the site rules data structure used by the decision engine disclosed herein is illustrated in FIG. 8. Skilled artisans appreciate that other site rules data structures may be adapted or otherwise implemented for used by the decision engine disclosed herein.

In some embodiments, the site rules and related function libraries are compiled or otherwise combined into a single file (i.e., a site rules definition file for a particular website) and hosted on the application server or placed on a CDN for the Visitor Client to retrieve (when needed) and load. As a non-limiting example, the site rules definition file may include a scope section defining one or more scope functions needed by the site rules defined in the site rules definition file. The actions and function libraries needed by the site rules defined in the site rules definition file may be stripped to contain only the necessary properties.

As illustrated in FIG. 8, the site rules data structure does not implement if/then statements. The elimination of if/then statements from site rules can reduce, if not eliminate, the need for a complex and sophisticated server-side decision engine, allowing for a very efficient client-side decision engine. In some embodiments, specific functions that can be used to acquire information from a page may be defined using a page data library. Other implementations of the site rules data structure may also be possible.

With the site rules data structure, site rules can describe what type of engagement should be presented on a website. Because the visitor behavior (page visits, actions taken on the page, etc.) and the current page context are available for use by the decision engine at the client side, they can also be used as part of the criteria for determining whether to engage, and the type of engagement to present. Visitor behavior, including their journey throughout the website, cart actions, checkout, as well as page events, like displaying of errors, can be saved in the local storage for use in subsequent evaluations as well.

In some embodiments, the decision engine of the Visitor Client may process site rules specific to the website with which the user is interacting. In some embodiments, a site rule is a combination of functions: location, criteria, and action.

In some embodiments, "location" refers to a zone of a site or the entire site (e.g., a specific web page). Thus, this is a function for determining whether the criteria should be evaluated.

In some embodiments, "criteria" refers to a set of (zero or more) per type functions that, when evaluated, returns a true or false or error (which are the only possible outcomes in some embodiments). In some embodiments, criteria may include visitor criteria and behavior criteria. Visitor criteria may include device data, stored cookie data, stored visitor profile data/identity data, or a combination thereof. Behavior criteria may include pages visited, actions performed, etc. In some embodiments, criteria are conditions that must be satisfied before an action can take place. In some embodiments, when multiple criteria are considered, they are evaluated using "AND" operators. When multiple criterion values are specified, they are evaluated using "OR" operators. Criteria may include exceptions: "Except when . . . "

As a specific example, criteria for a page where the title of the page contains "product" may include the following:
1) a user has been on a particular page for more than a specified time (e.g., 15 seconds)
2) a user's cart contains item(s) having a total value that meets or exceeds a specified amount (e.g., $500.00)
3) the current product has a value that meets or exceeds a specified amount (e.g., $200.00)
4) a visitor profile contains a high value (HV) tag
5) a local event has occurred (e.g., moused over ad, etc.)
6) a user inputs a certain word (e.g., "rich") into a certain field
7) a client side product configuration adjustment has occurred (e.g., due to customer interaction with a browser/web page to change something about the product)

In some embodiments, "action" may be one of three possible actions: success, failure, error (partial success). Actions may be triggered when all criteria for a given rule are satisfied. Examples of actions may include, proactively engage, update a visitor profile, push visitor profile data to the server, call a custom server action, etc.

Skilled artisans appreciate that domain-specific site rules disclosed herein are well-defined. They are not abstract, generic, or "if/then" statements. Since such statements do not exist in domain-specific site rules disclosed herein, the decision engine of the Visitor Client (e.g., decision engine 422 of Visitor Client 420) does not need to perform "if," "then," "or" analyses.

In some embodiments, "scoping" is used by the decision engine (e.g., decision engine 422) to define limitations on when certain site rules are evaluated at the client side. In some embodiments, the decision engine may evaluate a scope, if any, to determine whether to proceed with evaluating a site rule. If the scope returns false, the site rule associated with the scope is skipped. When a criterion is met (e.g., a user's pointing device hovers over or touches a specified location), a real time, localized decisioning may be made and an action communicated to an appropriate party for a specific engagement in context of the user and the user's interaction with the location.

For example, an action may be specified that when a user's pointing device hovers over or touches a specified location, send a notice to a widget manager (e.g., widget manager 428). The widget manager may cause a chat window to pop up right after the user's pointing device hovers over or touches the specified location, perhaps in proximity to the location, with an inviting message: "let me help you with this product."

As another example, an action may be specified that when a criterion is met, a customer representative is notified immediately. The customer representative or sales agent may attempt to engage with the user via one or more engagement channels. Examples of engagement channels may include online channels such as email, instant messaging, video chat, etc. as well as offline channels such as faxing, telephone calls, etc. The customer representative or sales agent may already have the user's phone number on file (in the user profile communicated to the agent via the Visitor Client) and may call the user upon receipt of the notice that the criterion is met.

In some embodiments, a Visitor Client may run continuously on a client device, evaluating domain-specific site rules in real-time as a website visitor interacts with a web page. The exact moment that a rule passes, appropriate engagement channel(s) may appear on the web page, allowing for immediate engagement with the website visitor. This can result in an extremely fast initiation of an engagement, which is crucial in situations where a website visitor may be about to abandon the website (e.g., due to a poor experience, or receiving too many errors on a form). This approach eliminates the lag between events occurring on the client-side and the decision to engage.

Figure 9:
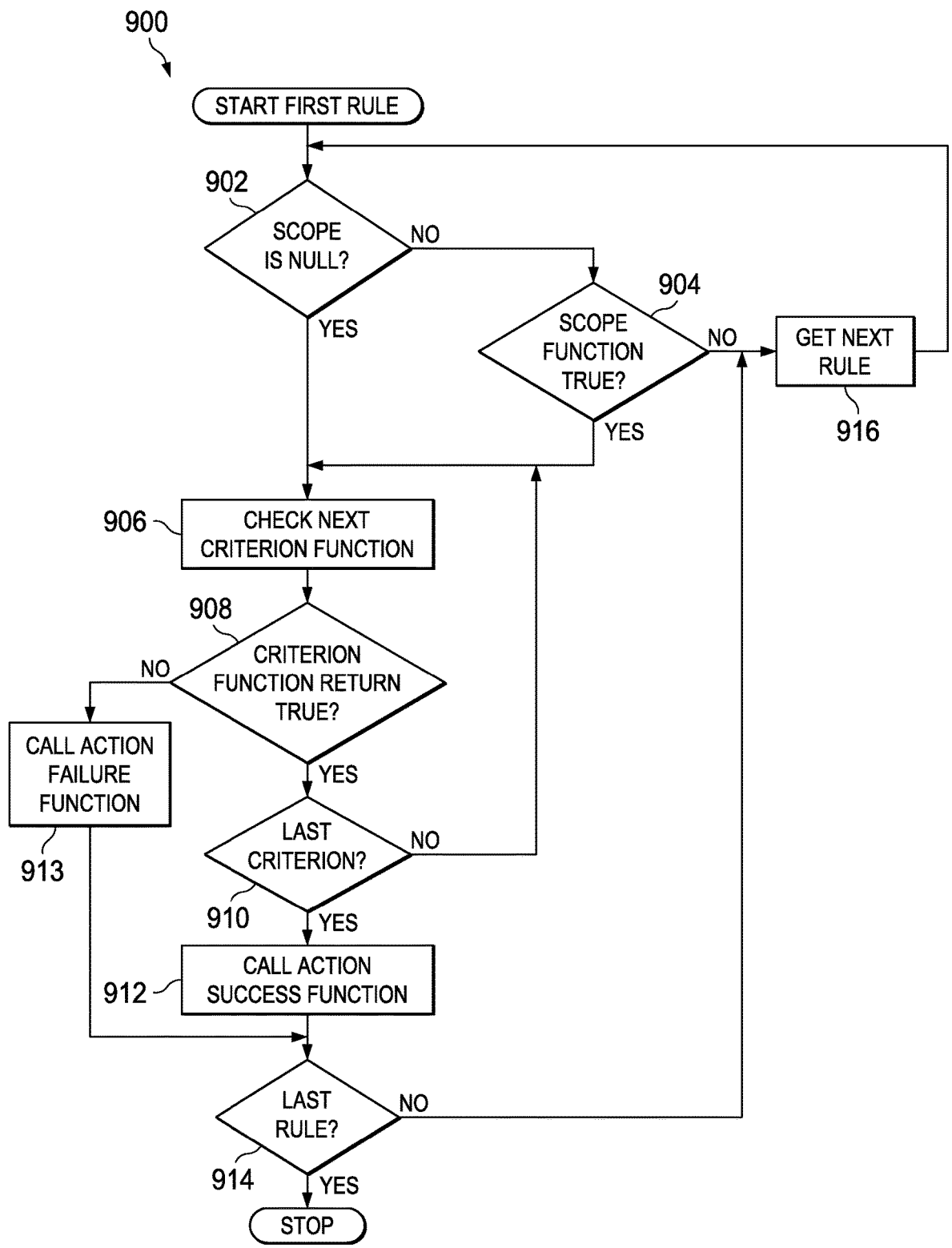
FIG. 9 depicts a flow diagram illustrating an example of a client-side decisioning process performed by a client-side decision engine according to one embodiment disclosed herein.

An example of a decisioning process performed by the decision engine of a Visitor Client is illustrated in FIG. 9. In some embodiments, a decision engine of a Visitor Client is called on a page load, as a result of an event callback, or by a context monitor of the Visitor Client to process site rules applicable to the page (e.g., site rules that are registered to be monitored for the particular site to which the page belongs) and execute actions. Action(s) can be called upon success of all the criteria in a rule or failure of any criterion.

As discussed above, the decision engine of the Visitor Client evaluates, at the client side, whether a website visitor's activities satisfy domain-specific site rules defined by the website owner. Each site rule may comprise a list of one or more criteria which the decision engine may iterate through. For example, the decision engine may determine if a rule scope is null (902). If not, the decision engine may determine whether the rule scope (e.g., location or time, as described above) is true (904). If the scope does not apply, the decision engine gets the next rule for evaluation (916). If the scope function returns true, or if the scope was null, the decision engine retrieves the next criterion function from the list for evaluation (906). The decision engine may determine if the criterion is satisfied (i.e., the criterion function returns true) (908). If not, then in some embodiments, an action failure function may be called (913). Then, a determination is made as to whether the last rule has been processed (914). If not, the next rule is fetched for evaluation (916). If the criterion function returns true (908), the decision engine may determine if the criterion is the last one in the rule (910). If the criterion is not the last one in the rule, the decision engine may proceed to check the next criterion (906). If the criterion is the last one in the rule, an action success function is called (912). Finally, a determination is made as to whether the last rule has been processed/evaluated (914). If not, decisioning process 900 may loop back and the decision engine may proceed to get the next rule (916). Decisioning process 900 stops when the last rule has been evaluated.

In some embodiments, an action library may be defined in the domain-specific rules definition file described above and may include a list of all the actions that can result from a rules evaluation pertaining to a page in the particular domain. Actions in the action library may be called upon success (of all the criteria in a rule) or failure (of any criterion in the rule).

Figures 10, 11:
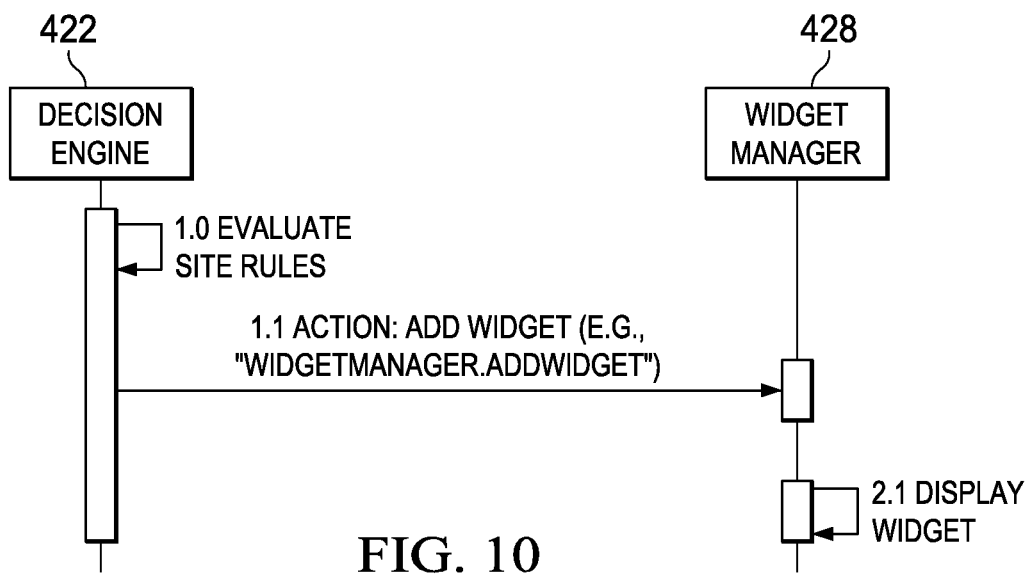
FIG. 10 depicts a sequence diagram illustrating an example of a client-side decision engine evaluating site rules and calling a widget manager according to one embodiment disclosed herein.
FIG. 11 depicts a diagrammatic representation of an example of an entity relationship diagram illustrating an engagement widget data structure according to one embodiment disclosed herein.

As a non-limiting example, an action success function when called may operate to generate an appropriate engagement widget, add the engagement widget to the web page (e.g., via an engagement layer implementing the Visitor Client), and display the engagement widget on the web page (e.g., via an engagement layer or a Visitor Client user interface such as Visitor Client user interface 550 shown in FIG. 5). An example of this process is illustrated in the sequence diagram depicted in FIG. 10. Each of engagement widget thus generated can function as a self-contained application that can be accessed via the Visitor Client user interface. An entity relationship implementing a data structure for an example engagement widget is illustrated in FIG. 11. Skilled artisans appreciate that engagement widgets can be implemented in many ways and are not limited to those disclosed herein.

Embodiments disclosed herein can provide many advantages. For example, the client-side contextual engagement decision making process described above is significantly faster than prior solutions, as it does not require communication to a decision engine executing on a server at the backend. Moreover, the client-side contextual engagement decision making process described above is decentralized, requiring far fewer server resources per visitor. Furthermore, the client-side contextual engagement decision making process described above can take into account the current web page context and events in real-time to thereby provide highly relevant and timely contextual engagement with website visitors. Relevancy may be determined, for example, by comparing the conversion rate of people engaged with a website implementing the client-side contextual engagement disclosed herein and the conversion rate of people engaged with a website implementing a time- or server-based approach.

Embodiments disclosed herein may be implemented in various types of data processing systems. As an example, a suitable data processing system may include at least one central processing unit (CPU) or processor coupled to one or more user input/output (I/O) devices and non-transitory memory devices. Examples of I/O devices may include, but are not limited to, keyboards, displays, monitors, touch screens, printers, electronic pointing devices such as mice, trackballs, styluses, touch pads, or the like. Examples of memory devices may include, but are not limited to, hard drives (HDs), magnetic disk drives, optical disk drives, magnetic cassettes, tape drives, flash memory cards, random access memories (RAMs), read-only memories (ROMs), smart cards, etc. A data processing system embodying a Visitor Client disclosed herein can be coupled to a display, an information device, and various peripheral devices such as printers, plotters, speakers, etc. through one or more I/O devices. A data processing system embodying a Visitor Client disclosed herein may also be coupled to external computers or other devices through a network interface, a wireless transceiver, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a general purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such product, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the invention should be determined by the following claims and their legal equivalents.

What is claimed is:

1. A method for client-side contextual engagement with a website visitor, comprising:
   responsive to the website visitor directing a browser running on a client device to a website, sending a request for a page from the client device to a web server hosting the website;
   receiving, by the client device, the page from the web server, the page including a script tag;
   adding a visitor client to the page using the script tag in the page, the script tag containing a resource location of a script file for the visitor client;
   wherein the adding the visitor client to the page from the web server includes:
      retrieving the script file from the resource location referenced in the script tag contained in the page from the web server;
      displaying a visitor client user interface overlaying the page without contacting the web server; and
      running the script file on the client device while the page from the web server is open on the client device;
   wherein running the script file on the client device causes the visitor client to:
      persist visitor client data in a local storage of the client device, the visitor client data including:
         predefined site rules for the website, the site rules describing contextual criteria for engaging the website visitor,
         a site rules definition file containing a scope section defining one or more scope functions for the predefined site rules for the website, and
         a visitor profile for the website visitor; and
      automatically initialize visitor client components on the client device, the visitor client components including a context monitor, a decision engine, and a widget manager;
   wherein, once initialized on the client device:
      the context monitor calls the decision engine while the page is loading on the client device:
      responsive to being called by the context monitor, the decision engine performs scoping of the predefined site rules for the website, the scoping performed by the decision engine on the client device using the one or more scope functions from the scope section of the site rules definition file in the visitor client data that is persisted in the local storage of the client device, the scoping identifying a set of site rules specifically applicable to the page or time or a combination thereof for the client device;
      the context monitor continuously monitors events occurring within the page reflective of activities by the website visitor relative to the page while the page is open on the client device;
      the context monitor calls the decision engine when a context on the page changes, the context defined at least in part by one or more of the events occurring within the page and the visitor profile for the website visitor;
      the decision engine evaluates, in real time and responsive to the context on the page changing, the set of site rules persisted in the local storage of the client device and scoped by the decision engine as applicable to the page or the time or the combination thereof;
      the decision engine communicates a result from the evaluating the set of site rules to the widget manager, the result responsive to the context on the page and containing a site rule action defined in a site rule of the set of site rules; and
      responsive to the site rule action in the result from the decision engine, the widget manager launches, on an engagement layer of the visitor client user interface overlaying the page, an engagement widget interface and displays, through the engagement widget interface and responsive to the context on the page, an engagement channel to an engagement server.

2. The method according to claim 1, wherein the visitor client components further include a log manager, wherein when a log event occurs, the decision engine evaluates, in real time and relative to the context defined at least partially by the log event and the visitor profile for the website visitor, the set of site rules persisted in the local storage of the client device and applicable to the page and communicates a result to the log manager.

3. The method according to claim 2, further comprising: the log manager sending the visitor profile to a server remote from the client device.

4. The method according to claim 1, wherein the events are Document Object Model (DOM) events.

5. The method according to claim 4, wherein the context is defined by the DOM events, the visitor profile, metadata associated with the page, device details about the client device, and location information associated with the website visitor.

6. The method according to claim 1, wherein the visitor client components further comprises a storage manager for managing the predefined site rules for the website and the visitor profile for the website visitor persisted in the local storage of the client device.

7. The method according to claim 1, wherein when initiated, the visitor client is configured for checking with an application server and dynamically updating the predefined site rules for the website.

8. The method according to claim 1, wherein the script file is retrieved from the web server, from the local storage on the client device, from an application server, from a content delivery network server (CDN), from a server communicatively connected to the CDN, or from a file server operating in a cloud computing environment.

9. The method according to claim 1, wherein the visitor client is specific to the website and operates within the page of the website.

10. The method according to claim 1, wherein the context monitor continues to monitor the context until the page is closed, a page timer has expired, the local storage is emptied, or a transaction is completed.

11. A system for client-side contextual engagement with a website visitor, comprising:
   at least one processor;
   a display;
   a local storage; and
   stored instructions translatable by the at least one processor for:
   responsive to a website visitor directing a browser running on the system to a website, sending a request for a page to a web server hosting the website;
   receiving the page from the web server, the page including a script tag;
   adding a visitor client to the page using the script tag in the page, the script tag containing a resource location of a script file for the visitor client;
   wherein the adding the visitor client to the page from the web server includes:
      retrieving the script file from the resource location referenced in the script tag contained in the page from the web server;
      displaying a visitor client user interface overlaying the page without contacting the web server; and
      running the script file on the system while the page from the web server is open on the display;
   wherein running the script file causes the visitor client to:
      persist visitor client data in a local storage of the system, the visitor client data including:
         predefined site rules for the website, the site rules describing contextual criteria for engaging the website visitor,
         a site rules definition file containing a scope section defining one or more scope functions for the predefined site rules for the website, and
         a visitor profile for the website visitor; and
      automatically initialize visitor client components on the system, the visitor client components including a context monitor, a decision engine, and a widget manager;
   wherein, once initialized on the system:
      the context monitor calls the decision engine while the page is loading on the display;
      responsive to being called by the context monitor, the decision engine performs scoping of the predefined site rules for the website, the scoping performed by the decision engine on the system using the one or more scope functions from the scope section of the site rules definition file in the visitor client data that is persisted in the local storage of the client device, the scoping identifying a set of site rules specifically applicable to the page or time or a combination thereof for the client device;
      the context monitor continuously monitors events occurring within the page reflective of activities by the website visitor relative to the page while the page is open on the display;
      the context monitor calls the decision engine when a context on the page changes, the context defined at least in part by one or more of the events occurring within the page and the visitor profile for the website visitor;
      the decision engine evaluates, in real time and responsive to the context on the page changing, the set of site rules persisted in the local storage of the client device and scoped by the decision engine as applicable to the page or the time or the combination thereof;
      the decision engine communicates a result from the evaluating the set of site rules to the widget manager, the result responsive to the context on the page and containing a site rule action defined in a site rule of the set of site rules; and
      responsive to the site rule action in the result from the decision engine, the widget manager launches, on an engagement layer of the visitor client user interface overlaying the page, an engagement widget interface and displays, through the engagement widget interface and responsive to the context on the page, an engagement channel to an engagement server.

12. The system of claim 11, wherein the visitor client components further include a log manager, wherein when a log event occurs, the decision engine evaluates, in real time and relative to the context defined at least partially by the log event and the visitor profile for the website visitor, the set of site rules persisted in the local storage of the client device and applicable to the page and communicates a result to the log manager.

13. The system of claim 12, wherein the log manager sends the visitor profile to a server remote from the client device.

14. The system of claim 11, wherein the events are Document Object Model (DOM) events.

15. The system of claim 14, wherein the context is defined by the DOM events, the visitor profile, metadata associated with the page, device details about the client device, and location information associated with the website visitor.

16. The system of claim 11, wherein the visitor client components further comprise a storage manager for managing the predefined site rules for the website and the visitor profile for the website visitor persisted in the local storage of the client device.

17. The system of claim 11, wherein when initiated, the visitor client is configured for checking with an application server and dynamically updating the predefined site rules for the website.

18. The system of claim 11, wherein the script file is retrieved from the web server, from the local storage on the client device, from an application server, from a content delivery network server (CDN), from a server communicatively connected to the CDN, or from a file server operating in a cloud computing environment.

19. The system of claim 11, wherein the visitor client is specific to the website and operates within the page of the website.

20. The system of claim 11, wherein the context monitor continues to monitor the context until the page is closed, a page timer has expired, the local storage is emptied, or a transaction is completed.

\* \* \* \* \*